United States Patent [19]

Pierson et al.

[11] Patent Number: 4,726,981
[45] Date of Patent: Feb. 23, 1988

[54] STRENGTHENED GLASS ARTICLES AND METHOD FOR MAKING

[75] Inventors: Joseph E. Pierson; Stanley D. Stookey, both of Painted Post, N.Y.

[73] Assignee: Corning Glass Works, Corning, N.Y.

[21] Appl. No.: 743,047

[22] Filed: Jun. 10, 1985

[51] Int. Cl.$^4$ .............................................. C03C 10/14
[52] U.S. Cl. .................................... 428/212; 428/426; 428/427; 428/428; 428/432; 428/446; 428/697; 428/701; 428/702; 501/4
[58] Field of Search ................... 428/427–429, 428/212, 426, 432, 446, 697, 701, 702; 501/4

[56] References Cited

U.S. PATENT DOCUMENTS

| 2,779,136 | 1/1957 | Hood | 428/428 |
| 3,649,440 | 3/1972 | Megles | 428/428 |
| 4,507,392 | 3/1985 | Rittler | 501/4 |

OTHER PUBLICATIONS

Advances in Glass Technology (1962), pp. 404–411, Plenum Press, New York City, H. M. Garfinkel et al.
S. S. Kistler, "Stresses in Glass Produced by Non uniform Exchange of Monovalent Ions," *Journal of the American Ceramic Society*, 45, 59–68, Feb., 1962.

Primary Examiner—John E. Kittle
Assistant Examiner—P. R. Schwartz
Attorney, Agent, or Firm—C. S. Janes, Jr.

[57] ABSTRACT

This invention is directed to the production of unitary, transparent glass articles demonstrating exceptionally high flexural and impact strengths composed of an interior portion and an integral surface compression layer. The articles are prepared by contacting glass bodies consisting essentially, in mole percent, of 14–24% $R_2O$, wherein $R_2O$ consists of 0–5% $Li_2O$, 0–5% $K_2O$, and the remainder $Na_2O$, 17–21% $Al_2O_3$, 45–60% $SiO_2$, 3–6% $TiO_2$ and/or $ZrO_2$, and 0–2% $P_2O_5$, the sum of those components constituting at least 85% of the total composition, at a temperature above the annealing point of the glass with a source of $Li^+$ ions to replace at least part of the $Na^+$ ions and, if present, $K^+$ ions in a surface layer with a corresponding amount of $Li^+$ ions and to react the $Li^+$ ions with $Al_2O_3$ and $SiO_2$ in the surface layer to form crystallites of beta-quartz solid solution nucleated by the $TiO_2$ and/or $ZrO_2$.

5 Claims, 1 Drawing Figure

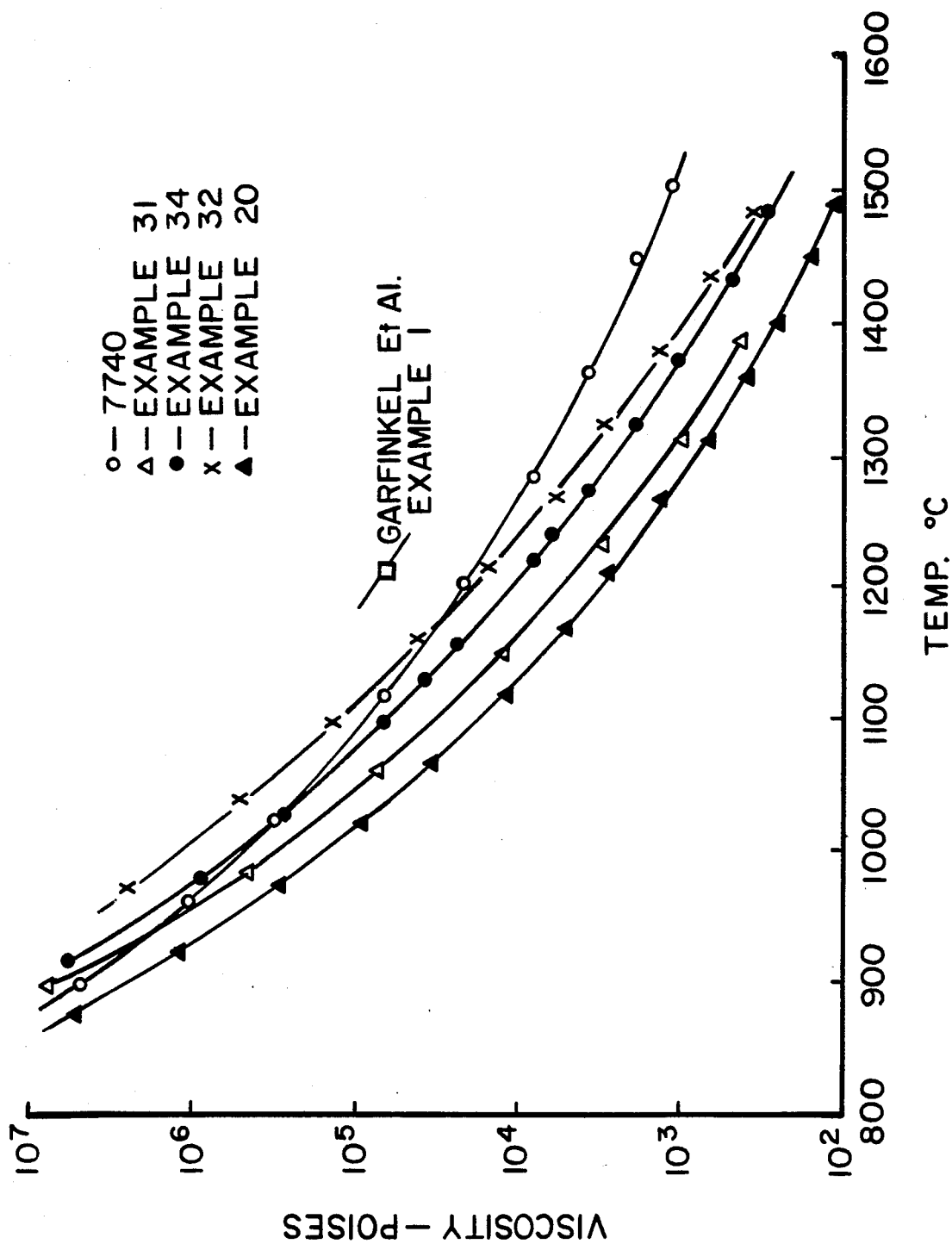

STRENGTHENED GLASS ARTICLES AND METHOD FOR MAKING

BACKGROUND OF THE INVENTION

Many methods have been devised to strengthen glass articles utilizing the mechanism of a compressive surface skin. The three techniques which have enjoyed the greatest commercial exploitation have been lamination, thermal or chill tempering, and chemical strengthening.

Lamination, involving the sealing together of two glasses having different coefficients of thermal expansion, results in compressive stress in the lower expansion glass and tensile stress in the higher expansion glass when the sealed pair is cooled. That compressive stress increases the mechanical strength of the higher expansion glass if the latter is enclosed within the lower expansion glass. Whereas CORELLE ® tableware, marketed by Corning Glass Works, Corning, N.Y., employs that technique of strengthening, its use has not been widespread because of practical difficulties in tailoring glass compositions which exhibit the proper expansion differentials, which will not adversely react with each other upon contact, and which have compatible viscosity characteristics.

The procedure which has been most widely used commercially for the strengthening of glass articles in thermal or chill tempering. The applicability of that process, however, is restricted to relatively thick-walled articles and the surface compressive stresses developed thereby are relatively low.

Two basic mechanisms have generally been recognized as underlying the chemical strengthening of glass articles.

One form of chemical strengthening comprises the replacement of a smaller alkali metal ion in the surface of a glass article with a larger alkali metal ion from an external source. In commercial practice the glass article containing the smaller alkali metal ions, e.g., $Li^+$ ions, is immersed into a bath of a molten salt containing $Na^+$ and/or $K^+$ ions operating at a temperature below the strain point of the glass. The $Li^+$ ions from the glass exchange with the $Na^+$ and/or $K^+$ ions from the bath on a one-for-one basis. By that exchange the larger $Na^+$ and/or $K^+$ ions are crowded or stuffed into the sites formerly occupied by the $Li^+$ ions, thereby setting up compressive stresses by expanding the surface, and the smaller $Li^+$ ions pass out into the bath. Because the exchange is carried out at a temperature below the strain point of the glass, relaxation of the glass surface is inhibited. That phenomenon was first clearly elucidated by S. S. Kistler in "Stresses in Glass Produced by Nonuniform Exchange of Monovalent Ions", *Journal of American Ceramic Society*, 45, No. 2, pp. 59–68, February, 1962. This technique has been limited commercially to special products, most notably ophthalmic lenses, because the low temperature ion exchange requires a relatively long immersion period, e.g., 16–24 hours.

The second basic form of chemically strengthening glass articles, exemplified by U.S. Pat. No. 2,779,136 and termed high temperature exchange, involves the replacement of $Na^+$ and/or $K^+$ ions in a glass surface with $Li^+$ ions from an outside source. Thus, the glass article is immersed into a bath of a molten salt containing $Li^+$ ions operating at a temperature above the strain point of the glass. The $Li^+$ ions diffuse into the glass surface and exchange one-for-one with the $Na^+$ and/or $K^+$ ions. Because the exchange is carried out at temperatures above the strain point of the glass, relaxation takes place in the glass surface such that a $Li^+$ ion-containing glass skin is developed. Since this $Li^+$ ion-containing glass skin exhibits a lower coefficient of thermal expansion than that of the original glass article, when the article is cooled to room temperature the interior glass contracts more than the skin glass, thereby producing a surface compression layer. Where $TiO_2$ and $Al_2O_3$ were present in the glass compositions, the diffusing $Li^+$ ions reacted therewith to form beta-spodumene crystals, resulting in a surface skin exhibiting a still lower coefficient of thermal expansion, but also being translucent-to-opaque, rather than transparent. Glasses suitable for use in that inventive practice consisted essentially, in weight percent, of

| $SiO_2$ | 45–80 | $Al_2O_3$ | 7.5–25 | $Li_2O$ | 0–2 |
|---|---|---|---|---|---|
| $Na_2O$ and/or $K_2O$ | 8–15 | $ZrO_2$ | 0–5 | | |
| $TiO_2$ | 0–15 | $B_2O_3$ | 0–2 | | |

The working examples of the patent utilized baths of molten salts containing $Li^+$ ions operating at temperatures over the interval of 550°–900° C. and for immersion times ranging from two minutes to 15 hours, with the majority of the exemplary baths operating at temperatures between about 600°–825° C. and immersion times of 10–30 minutes. Modulus of rupture values as high as 75,000 psi were reported. This second basic form of chemically strengthening glass articles has not seen commercial service.

In *Advances in Glass Technology* (1962), pp. 404–411, Plenum Press, New York City, in a section entitled "Strengthening by Ion Exchange", H. M. Garfinkel et al. expanded upon the high temperature chemical strengthening practice of U.S. Pat. No. 2,779,136. They reported treating glass rods consisting essentially, in weight percent of 1.1% $Li_2O$, 11.0% $Na_2O$, 23.7% $Al_2O$, 6.2% $TiO_2$, 57.2% $SiO_2$, and 0.5% $As_2O_3$ for five minutes in a bath of molten 95% $Li_2SO_4$–5% $Na_2SO_4$ (weight percent) operating at 860° C. to yield transparent products exhibiting moduli of rupture values of 70–80 kg/mm² (~100,000–115,000 psi). X-ray diffraction study of the glass surface indicated the presence of an integral thin layer containing crystals identified as being those of a solid solution of β-eucryptite (classic formula $Li_2O.Al_2O_3.2SiO_2$) and quartz. No commercial application of that chemical strengthening technique has been reported, probably because the glass was too viscous to be melted in conventional, continuous-melting tanks such as are used for making drinkware, flat glass, and container glass, and the fact that an immersion temperature of 860° C. is well above the deformation temperature of the large volume-type commercial glasses.

SUMMARY OF THE INVENTION

We have found an area of glass compositions having sufficiently low viscosities to be melted in conventional, continuous-melting tanks which, when subjected to the above-described high temperature exchange, can demonstrate flexural strengths, as measured in terms of modulus of rupture, in excess of ten times that in the annealed state, and impact strengths up to 50 times that in the annealed state. In broadest terms, the present invention is directed to the manufacture of unitary, transparent or opaque, very high strength glass articles from glass compositions in the $SiO_2$-$Al_2O_3$-$R_2O$-$TiO_2$ and/or $ZrO_2$ system, wherein $R_2O$ consists of $Na_2O$ and, optionally, $Li_2O$ and/or $K_2O$, the surfaces of which are contacted for as brief a time as a few minutes, e.g., no more than five minutes, at a temperature above the annealing point of the glass with an external source of $Li^+$ ions, whereby $Li^+$ ions from the external source move into the glass surface and exchange on a one-for-one molar basis with $Na^+$ ions and, if present, $K^+$ ions from within the glass surface, and subsequently react with $Al_2O_3$ and $SiO_2$, to the accompaniment of $TiO_2$ and/or $ZrO_2$ internal nucleation, to generate in situ invisibly small crystallites of beta-quartz solid solution (also termed beta-eucryptite solid solution) exhibiting very low or zero coefficients of thermal expansion (25°–300° C.) in a thin surface layer. It is this great difference in thermal expansion between the integral surface layer and the higher expansion interior portion of the glass which causes the development of high compressive stresses in the surface layer, and ultimately imparts the desired tremendous flexural and impact strengths.

The inventive compositions consist essentially, expressed in terms of mole percent on the oxide basis, of about 45–60% $SiO_2$, 17–21% $Al_2O_3$, 14–24% $R_2O$, 3–6% $TiO_2$ and/or $ZrO_2$. $K_2O$ and $Li_2O$ will customarily be limited to a maximum of 5%. The inclusion of up to 2% $P_2O_5$ appears to improve the transparency of the final products. The sum of $R_2O+Al_2O_3+SiO_2+TiO_2$ and/or $ZrO_2+P_2O_5$ will constitute at least 85% of the total composition. For the greatest transparency and strength, the mole ratio $Al_2O_3+P_2O_5:R_2O$ will be greater than 0.8, but less than 1.2. Up to 2% fluoride and/or $B_2O_3$ is beneficial in softening the glass. Although a precise mathematical conversion of ranges in mole percent to ranges in weight percent is not possible, an approximation of such a conversion yields about 47–70% $SiO_2$, 3–6% $TiO_2$ and/or $ZrO_2$, 26–30% $Al_2O_3$, and the remainder $R_2O$. As such, the $Al_2O_3$ content is greater than maximum of 25% disclosed in U.S. Pat. No. 2,779,136.

As the mole ratio $Al_2O_3+P_2O_5:R_2O$ decreases below 0.9, there is a gradual increase in the tendency of the glass to become translucent or opaque. Between a ratio of 0.8–0.9, this tendency can be avoided by decreasing the time of or the temperature of the exchange reaction or, if desired, this tendency can be controllably implemented by careful regulation of time and/or temperature in the exchange. Consequently, a high strength opal glass article can be produced in which the above ratio approaches the lower limit of 0.8.

The inventive compositions also contemplate the optional addition of up to about 10 mole percent CaO and/or MgO, and/or ZnO up to about 5 mole percent. The presence of $Mg^{+2}$ and $Zn^{+2}$ ions is especially desirable since they can enter into the beta-quartz solid solution crystals on a $Mg^{+2}$ for $2Li^+$ ions or a $Zn^{+2}$ for $2Li^+$ ions basis, and the inclusion of those oxides, in like manner to the incorporation of F and/or $B_2O_3$, serves to reduce the viscosity of the glass melt, thereby rendering the glasses more conducive for melting and forming using conventional glass melting and forming techniques.

A very important objective of the present invention was to develop glass compositions suitable for large scale, commercial production of transparent, high strength glassware. Such a goal renders it self-evident that the glass must be meltable in large, commercial, continuous melting tanks and, hence, that the viscosity of the glass at reasonable melting temperatures must not be significantly greater than the viscosity of glasses made commercially on a large scale.

The appended drawing presents a comparison of viscosity-temperature curves of Corning 7740, a borosilicate commercially marketed on a large scale by Corning Glass Works, Corning, N.Y., under the trademark PYREX ®, and four exemplary compositions of the instant invention, those compositions being reported in Table I infra. As can be observed therefrom, the inventive glasses are sufficiently fluid for large scale manufacture. (It must be understood that the examples of inventive glasses recorded in the drawing must not be assumed to represent the lowest viscosity compositions, but merely demonstrate a range of useful glasses.)

The viscosity of Example 1 in the Garfinkel et al. literature reference discussed above was reported as 65,000 poises at about 1210° C. Such viscosity is about two to three times higher than Corning Code 7740 and, therefore, the glass is not practical for melting in conventional large scale, continuous melting tanks.

The annealing points of the inventive glasses range between about 595°–700° C. with softening points at least 150° C. and, frequently, 200° C. thereabove. Most advantageously, the ion exchange of $Li^+$ ions for $Na^+$ and, optionally, $K^+$ ions will be conducted at temperatures at least 100° C. above the annealing point of the glass and at least 25° C. and, preferably, at least 50° C. below the softening point of the glass.

The strengthening process can be accomplished with a variety of $Li^+$ ion-containing salt baths, including low melting sulfate baths such as $Li_2SO_4$-$Na_2SO_4$ and $Li_2SO_4$-$K_2SO_4$ eutectics, nitrate baths, etc. It can also be effective and commercially profitable to effect the ion exchange through means other than immersion in a salt bath. For example, $Li^+$ ion-containing coatings may be applied either hot or cold, and/or a glass body exposed to $Li^+$ ion-containing vapors, with appropriate heat treatments to develop an integral, ion exchanged, internally-nucleated, crystallized surface layer containing beta-quartz solid solution. It must be appreciated that where a $Li^+$ ion exchange coating is applied cold, rapid heating of the body will be required to avoid surface cracking resulting from the exchange reaction taking place below the strain point of the glass.

This latter practice renders it practical to produce thin-walled (~0.010"–0.020"), high strength, lightweight blown glassware ion exchanged on the inside by blowing a hot spray of a $Li^+$ ion-containing substance together with air thereon as the ware is being blown into shape, and ion exchanged on the outside thereof by blowing vapors of a $Li^+$ ion-containing substance or hot spraying a $Li^+$ ion-containing substance thereon, followed by a short (generally a few minutes) heat treatment of the ware, cooling, and washing. This embodiment enables the strengthening of blown glassware to be conducted on an on-line continuous process, where desired.

In general, an ion exchanged, crystallized surface layer having a thickness no greater than about 0.001" (~25 microns) will be sufficient to impart the desired exceptionally high flexural and impact strengths, although greater depths of exchange can be controllably and beneficially achieved by modifying the base glass composition, the composition of the $Li^+$ ion-containing material, and/or the time and temperature of the heat treatment. Greater depths of layer provide more protection from surface abuse of the ware in service. Thus, one particularly significant advantage of this invention is the unique combination of very high compressive stress and the extremely thin, uniform, controllable nature of the integral low expansion surface layer. That combination results in a minimum of tensile stress being built up in the relatively thick body portion, even when the thickness of the ware is no more than about 0.010". Accordingly, should breakage occur, the fracture will be gentle. In contrast, a thick surface compression layer leads to increased tensile stress within the ware with consequent more violent fragmentation upon breakage. Moreover, the very thinness of the glass article renders it flexible, thereby resulting in greater impact resistance because the flexing action absorbs some of the impact energy.

Finally, the present invention envisions the capability of providing different stress profiles in the glass article. For example, by controlling the time and temperature of the ion exchange reaction, it is possible to produce an outer skin layer which exhibits very high compressive stresses because of the presence of beta-quartz solid solution crystals therein, and a somewhat deeper layer of lower compressive stresses resulting from the exchange of $Li^+$ ions for $Na^+$ ions and, if present, $K^+$ ions, but wherein crystals have not had time to develop to any significant extent. In another example, the ion exchanged article may be subjected to thermal tempering and the stress profile resulting from that treatment impressed upon the stress distribution pattern imparted by the ion exchange. A somewhat similar circumstance is described in U.S. Pat. No. 3,649,440, which discloses the thermal tempering of laminated glass articles to achieve greater impact strength and resistance to spontaneous breakage resulting from bruise checking. Those improvements can also be found in the present inventive products.

The exceptional high strength and impact resistance of the inventive glasses, coupled with the ready melting and forming via conventional glass melting and forming techniques, have unqualifiedly recommended their utility for such varied applications as thin walled, light weight containers, drinkware, and impact resistant faceplates for motor vehicle headlights.

To achieve the most ideal matrix of melting and forming capabilities, coupled with highly desirable physical properties, the most preferred compositions will consist essentially, expressed in terms of mole percent on the oxide basis, of about 14–16% $R_2O$, wherein $R_2O$ consists of 0–3% $Li_2O$, 0–3% $K_2O$, and the remainder, $Na_2O$, 5–10% MgO, 17–20% $Al_2O_3$, 50–60% $SiO_2$, 3–6% $TiO_2$ and/or $ZrO_2$, and 0–2% $P_2O_5$. An approximate conversion of those levels to weight percent results in about 12–14% $R_2O$, wherein $R_2O$ consists of 0–2% $Li_2O$, 0–2% $K_2O$, and the remainder $Na_2O$, 3–7% MgO, 26–30% $Al_2O_3$, 47–57% $SiO_2$, 3–6% $TiO_2$ and/or $ZrO_2$, and 0–3% $P_2O_5$.

BRIEF DESCRIPTION OF THE DRAWING

The appended drawing comprises a series of viscosity-temperature curves comparing four glasses of the present invention with a commercial borosilicate glass and an exemplary composition from the Garfinkel et al. literature reference discussed above.

DESCRIPTION OF PREFERRED EMBODIMENTS

Table I records a number of glass compositions, expressed in terms of approximate mole percent on the oxide basis, illustrating the present invention. Table IA recites those glass compositions in terms of parts by weight on the oxide basis. Inasmuch as the sum of the individual components of Table IA totals or closely approximates 100, for all practical purposes the values reported may be deemed to represent weight percent. The actual batch ingredients may comprise any materials, either the oxide or other compound, which, upon melting together, will be converted into the desired oxide in the proper proportions.

In Examples 1–23 the batch constituents were compounded, ballmilled together to aid in securing a homogeneous melt, and the mixture charged into platinum crucibles. $Sb_2O_3$ and $As_2O_3$ perform their customary function as fining agents. The crucibles were introduced into a furnace operating at about 1500°–1600° C., the batches melted for about 16 hours with stirring, and molten glass gobs were gathered in the crucibles to be drawn into long rods about 0.25" in diameter.

In Examples 24–27 sufficient quantities of the batches were compounded and mixed together for use in a pilot plant day tank. Glass slabs having the approximate dimensions of 6"×6"×0.5" were poured and beakers having a wall thickness of about 0.58–0.082" were hand blown from the melts. Bars having the approximate dimensions of 5"×0.25"×0.25" were cut from the slabs.

TABLE I

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 50.88 | 53.41 | 55.89 | 50.66 | 53.17 | 56.94 | 57.43 | 57.97 | 55.20 | 56.13 | 54.61 | 53.48 | 57.19 | 55.27 |
| $Al_2O_3$ | 23.16 | 21.96 | 20.77 | 22.37 | 21.18 | 16.66 | 18.15 | 19.67 | 17.10 | 17.71 | 19.99 | 20.00 | 18.04 | 18.94 |
| $Na_2O$ | 17.62 | 16.37 | 15.13 | 18.67 | 17.41 | 18.64 | 16.60 | 14.48 | 18.30 | 19.32 | 18.48 | 19.60 | 16.34 | 17.13 |
| $Li_2O$ | 2.66 | 2.64 | 2.62 | 2.64 | 2.62 | 2.28 | 2.30 | 2.33 | 2.21 | 2.29 | 2.33 | 2.33 | 2.34 | — |
| $TiO_2$ | 5.46 | 5.46 | 5.38 | 5.44 | 5.40 | 5.26 | 5.31 | 5.36 | 3.3 | 4.26 | 4.32 | 4.32 | 4.34 | 4.58 |
| $Sb_2O_3$ | 0.5 | 0.5 | 0.5 | 0.5 | 0.5 | 0.5 | 0.5 | 0.5 | 0.5 | — | — | — | — | — |
| $As_2O_3$ |  |  |  |  |  |  |  | — | — | 0.5 | 0.5 | 0.5 | 0.5 | 0.5 |
| $ZrO_2$ |  |  |  |  |  |  |  |  | 2.14 | — | — | — | — | — |
| $B_2O_3$ |  |  |  |  |  |  |  | — | — | — | — | — | 1.48 | — |
| $P_2O_5$ |  |  |  |  |  |  |  | — | — | — | — | — | — | 0.75 |
| $K_2O$ |  |  |  |  |  |  |  | — | — | — | — | — | — | 3.06 |
| MgO |  |  |  |  |  |  |  |  |  |  |  |  |  |  |
| CaO |  |  |  |  |  |  |  |  |  |  |  |  |  |  |

|  | 15 | 16 | 17 | 18 | 19 | 20 | 21 | 22 | 23 | 24 | 25 | 26 | 27 |
|---|---|---|---|---|---|---|---|---|---|---|---|---|---|
| $SiO_2$ | 54.49 | 54.63 | 52.19 | 53.06 | 52.25 | 53.27 | 54.47 | 55.17 | 50.1 | 55.65 | 54.8 | 58.5 | 59.0 |
| $Al_2O_3$ | 18.68 | 18.53 | 18.91 | 20.91 | 17.13 | 17.29 | 17.43 | 17.43 | 18.2 | 20.01 | 18.5 | 16.9 | 19.0 |
| $Na_2O$ | 16.89 | 16.75 | 17.10 | 18.24 | 14.05 | 12.72 | 11.1 | 18.74 | 11.7 | 16.17 | 16.7 | 18.7 | 14.45 |
| $Li_2O$ | 2.38 | 2.36 | 2.41 | 2.34 | 2.22 | 2.22 | 2.22 | 2.29 | — | 2.60 | 2.32 | 2.22 | — |
| $TiO_2$ | 3.54 | 4.47 | 4.57 | 5.23 | 4.82 | 4.88 | 4.88 | 4.28 | 4.7 | 5.36 | 4.00 | 3.1 | 3.45 |
| $Sb_2O_3$ | — | — | — | 0.12 | 0.11 | 0.11 | 0.11 | 0.12 | 0.1 | — | 0.5 | 0.5 | 0.4 |

TABLE I-continued

| | | | | | | | | | | | | | |
|---|---|---|---|---|---|---|---|---|---|---|---|---|---|
| As₂O₃ | 0.5 | 0.5 | 0.5 | — | — | — | — | — | — | 0.5 | — | — | — |
| ZrO₂ | — | — | — | — | — | — | — | — | — | — | — | 2.0 | 0.56 |
| B₂O₃ | | | | | | | | 2.00 | — | — | — | — | — |
| P₂O₅ | 0.74 | — | 1.50 | — | — | — | — | — | — | — | 0.7 | — | — |
| K₂O | 3.02 | 2.99 | 3.06 | — | — | — | — | — | 3.5 | — | 3.0 | — | — |
| MgO | — | — | — | — | 9.41 | 9.50 | 9.62 | — | 3.5 | — | — | — | 3.36 |
| CaO | | | | | | | | — | 9.9 | — | — | — | — |

TABLE IA

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| SiO₂ | 43.28 | 45.77 | 48.26 | 43.28 | 45.77 | 50.31 | 50.30 | 50.33 | 49.5 | 49.44 | 47.44 | 46.44 | 50.20 | 46.69 |
| Al₂O₃ | 33.43 | 31.93 | 30.44 | 32.43 | 30.94 | 24.99 | 26.98 | 28.99 | 25.0 | 26.47 | 29.47 | 29.47 | 26.88 | 27.16 |
| Na₂O | 15.46 | 14.47 | 13.48 | 16.46 | 15.46 | 16.99 | 15.00 | 12.97 | 17.0 | 17.56 | 16.56 | 17.56 | 14.80 | 14.93 |
| Li₂O | 1.12 | 1.12 | 1.12 | 1.12 | 1.12 | 1.00 | 1.00 | 1.00 | 1.0 | 1.01 | 1.01 | 1.01 | 1.02 | — |
| TiO₂ | 6.18 | 6.18 | 6.18 | 6.18 | 6.18 | 6.18 | 6.18 | 6.18 | 4.0 | 4.99 | 4.99 | 4.99 | 5.07 | 5.14 |
| Sb₂O₃ | 0.50 | 0.50 | 0.50 | 0.50 | 0.50 | 0.50 | 0.50 | 0.50 | 0.50 | — | — | — | — | — |
| As₂O₃ | | | | | | | | — | — | 0.50 | 0.50 | 0.50 | 0.51 | 0.50 |
| ZrO₂ | | | | | | | | — | 4.0 | — | — | — | — | — |
| B₂O₃ | | | | | | | | — | — | — | — | — | 1.50 | — |
| P₂O₅ | | | | | | | | — | — | — | — | — | — | 1.50 |
| K₂O | | | | | | | | — | — | — | — | — | — | 4.05 |
| MgO | | | | | | | | | | | | | | |
| CaO | | | | | | | | | | | | | | |

| | 15 | 16 | 17 | 18 | 19 | 20 | 21 | 22 | 23 | 24 | 25 | 26 | 27 |
|---|---|---|---|---|---|---|---|---|---|---|---|---|---|
| SiO₂ | 47.2 | 47.7 | 44.7 | 47.70 | 47.4 | 48.5 | 49.3 | 48.5 | 44.4 | 48.30 | 46.73 | 49.0 | 51.0 |
| Al₂O₃ | 26.9 | 26.9 | 26.9 | 26.57 | 26.37 | 26.6 | 26.9 | 26.0 | 26.7 | 29.50 | 26.90 | 24.8 | 27.8 |
| Na₂O | 14.8 | 14.8 | 14.8 | 15.22 | 13.15 | 11.9 | 10.4 | 17.0 | 10.2 | 14.50 | 14.80 | 17.0 | 13.3 |
| Li₂O | 1.0 | 1.0 | 1.0 | 1.0 | 1.0 | 1.0 | 1.0 | 1.0 | — | 1.0 | 1.0 | 1.0 | 1.0 |
| TiO₂ | 4.0 | 5.1 | 5.1 | 6.0 | 5.82 | 5.88 | 5.93 | 5.0 | 5.5 | 6.2 | 4.5 | 3.95 | 4.0 |
| Sb₂O₃ | — | — | — | 0.5 | 0.5 | 0.5 | 0.5 | 0.5 | — | — | 0.5 | 0.5 | 0.4 |
| As₂O₃ | 0.5 | 0.5 | 0.5 | — | — | — | — | — | 0.5 | — | — | — | — |
| ZrO₂ | — | — | — | | | | | | | — | | 3.78 | 0.65 |
| B₂O₃ | — | — | — | — | — | — | 2.0 | — | — | 1.5 | — | — | — |
| P₂O₅ | 1.5 | — | 3.0 | | | | | | | | | | |
| K₂O | 4.0 | 4.0 | 4.0 | — | — | — | — | 2.5 | — | 4.0 | — | — | — |
| MgO | | | | — | 5.73 | 5.78 | 5.84 | — | 2.0 | — | — | — | 1.86 |
| CaO | | | | — | — | — | — | — | 8.0 | — | | | |

Table II lists molar ratios of Al₂O₃:Na₂O+Li₂O (A:N+L), of Al₂O₃:Na₂O+Li₂O+K₂O(A:N+L+K), and of Al₂O₃+P₂O₅:Na₂O+Li₂O+K₂O (A+P:N+L+K) for the exemplary compositions of Table I along with softening points in °C. (S.P.), annealing points in °C. (A.P.), strain points in °C. (St. P.), and coefficients of thermal expansion in terms of $\times 10^{-7}/$°C. (Exp.), were measured on the glasses of Table I, those determinations being made utilizing techniques conventional in the glass art.

The above-described rods of each exemplary composition were heated in air to the temperature in °C. and for the time in minutes reported in Table III. The bars were thereafter immersed into a batch of molten 73.5% Li₂SO₄, 9.1% Na₂SO₄, 17.4% K₂SO₄ (weight %) operating at the temperature in °C. and for the time in minutes recorded in Table III. After removal from the salt bath, rinsing, and drying, the rods were abraded by rubbing with 30 grit SiC paper, and the flexural strength ($K_{psi}$) in terms of modulus of rupture (MOR) measured by breaking the bars in the conventional manner. Those values are also recited in Table III.

TABLE II

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| A:N + L | 1.14 | 1.16 | 1.17 | 1.05 | 1.06 | 0.80 | 0.96 | 1.17 | 0.835 | 0.82 | 0.85 | 0.91 | 0.97 | 1.12 |
| A:N + L + K | 1.14 | 1.16 | 1.17 | 1.05 | 1.06 | 0.80 | 0.96 | 1.17 | 0.835 | 0.82 | 0.85 | 0.91 | 0.97 | 0.94 |
| A + P:N + L + K | 1.14 | 1.16 | 1.17 | 1.05 | 1.06 | 0.80 | 0.96 | 1.17 | 0.835 | 0.82 | 0.85 | 0.91 | 0.97 | 0.975 |
| S.P. | — | — | — | — | — | — | — | — | — | — | — | — | — | — |
| A.P. | — | — | — | — | — | — | — | — | — | 612 | — | — | 633 | 671 |
| St. P. | — | — | — | — | — | — | — | — | — | 559 | — | — | 589 | 622 |
| Exp. | — | — | — | — | — | — | — | — | — | 98.7 | — | — | 89.8 | 92.6 |

| | 15 | 16 | 17 | 18 | 19 | 20 | 21 | 22 | 23 | 24 | 25 | 26 | 27 |
|---|---|---|---|---|---|---|---|---|---|---|---|---|---|
| A:N + L | 0.97 | 0.96 | 0.97 | 1.02 | 1.05 | 1.15 | 1.31 | 0.83 | 1.20 | 1.07 | 0.97 | 0.81 | 1.31 |
| A:N + L + K | 0.84 | 0.84 | 0.86 | 1.02 | 1.05 | 1.15 | 1.31 | 0.83 | 1.20 | 1.07 | 0.84 | 0.81 | 1.31 |
| A + P:N + L + K | 0.87 | 0.84 | 0.905 | 1.02 | 1.05 | 1.15 | 1.31 | 0.83 | 1.20 | 1.07 | 0.87 | 0.81 | 1.31 |
| S.P. | — | — | — | — | — | 916 | — | — | 853 | — | 833 | 845 | 942 |
| A.P. | 602 | 594 | 613 | — | 645 | 669 | 653 | 614 | 678 | 673 | 607 | 624 | 704 |
| St. P. | 560 | 552 | 577 | — | 605 | 625 | 605 | 571 | 639 | 633 | 563 | 582 | 655 |
| Exp. | 106.0 | 105.0 | 105.0 | — | 80.6 | 77.6 | 68.8 | 96.0 | 79.2 | 83.7 | 101.7 | 96.1 | 68.2 |

TABLE III

| | Air Heating | | Salt Bath | | |
|---|---|---|---|---|---|
| Example | Temp. | Time | Temp. | Time | MOR |
| 1 | 820 | 2 | 820 | 5 | 30 |
| 2 | 840 | 2 | 840 | 5 | 105 |
| 3 | 840 | 2 | 840 | 5 | 95 |

TABLE III-continued

| Example | Air Heating Temp. | Air Heating Time | Salt Bath Temp. | Salt Bath Time | MOR |
|---|---|---|---|---|---|
| 4 | 780 | 2 | 780 | 5 | 26 |
| 5 | 820 | 2 | 820 | 5 | 106 |
| 6 | 780 | 2 | 780 | 5 | 32 |
| 7 | 840 | 2 | 840 | 5 | 126 |
| 8 | 860 | 2 | 860 | 5 | 102 |
| 9 | 750 | 2 | 750 | 10 | 99 |
| 10 | 800 | 2 | 800 | 10 | 105 |
| 11 | 780 | 2 | 780 | 10 | 49 |
| 12 | 720 | 2 | 720 | 40 | 112 |
| 13 | 800 | 2 | 800 | 10 | 97 |
| 19 | 780 | 2 | 780 | 30 | 113 |
| 20 | 800 | 2 | 800 | 10 | 111 |
| 21 | 800 | 2 | 800 | 10 | 93 |
| 24 | 800 | 2 | 800 | 10 | 106 |
| 26 | 750 | 2 | 750 | 10 | 99 |
| 27 | 800 | 2 | 800 | 10 | 68 |

The above-described hand blown beakers were heated in air to the temperature in °C. and for the time in minutes recorded in Table IV. The beakers were thereafter immersed into a bath of molten $Li_2SO_4 + Na_2SO_4 + K_2SO_4$ having the same composition as the bath reported above operating at the temperature in °C. and for the time in minutes listed in Table IV. After removal from the salt bath, rinsing, and drying, the beakers were abraded inside the rim thereof by rubbing with No. 30 SiC paper for about 15 seconds and the impact strength in foot pounds measured utilizing the pendulum steel ball drop test. The wall thickness of each sample in inches is also reported in Table IV.

TABLE IV

| Example | Air Heating Temp. | Air Heating Time | Salt Bath Temp. | Salt Bath Time | Thick | Impact Strength |
|---|---|---|---|---|---|---|
| 24 | 800 | 5 | None | | 0.070 | 0.010 |
| 24 | 800 | 5 | 800 | 2 | 0.070 | 0.03 |
| 24 | 800 | 5 | 800 | 5 | 0.070 | 0.12 |
| 24 | 800 | 5 | 800 | 8 | 0.070 | >0.20 |
| 24 | 800 | 5 | 800 | 10 | 0.070 | 0.40 |
| 24 | 800 | 5 | 800 | 10 | 0.070 | >0.49 |
| 26 | 740 | 5 | 740 | 10 | 0.070 | 0.045 |
| 26 | 740 | 3 | 740 | 8 | 0.070 | 0.053 |
| 27 | Annealed | | None | | 0.058 | 0.01 |
| 27 | 790 | 2 | 790 | 30 | 0.082 | 0.027 |
| 27 | 790 | 2 | 790 | 60 | | 0.257 |
| 18 | — | — | 800 | 10 | 0.070 | 0.061 |

In view of the its excellent melting and forming characteristics, Example 20 is believed to constitute the most commercially viable composition.

We claim:

1. A unitary glass article which is transparent, translucent, or opaque exhibiting exceptionally high flexural and impact strengths composed of an interior glass portion and an integral surface compression layer having a depth of at least 0.001", said surface layer containing crystallites of beta-quartz solid solution which have a coefficient of thermal expansion substantially lower than that of said interior glass portion, said interior portion consisting essentially, expressed in terms of mole percent on the oxide basis, of about 14–24% $R_2O$, wherein $R_2O$ consists of the sum of 0–5% $Li_2O$ + 0–5% $K_2O$ + the remainder $Na_2O$, 17–21% $Al_2O_3$, 45–60% $SiO_2$, 3–6% total of at least one oxide selected from the group consisting of $TiO_2$ and $ZrO_2$, and 0–2% $P_2O_5$, the sum of $R_2O + Al_2O_3 + SiO_2 + TiO_2 + ZrO_2 + P_2O_5$ constituting at least 85% of the total composition, and said surface layer containing $Li^+$ ions in greater amount than in said interior portion with a corresponding decrease in $Na^+$ and $K^+$ ions.

2. A glass article according to claim 1 exhibiting transparency wherein the mole ratio $Al_2O_3 + P_2O_5:R_2O$ is greater than 0.8 but less than 1.2.

3. Transparent, thin walled, lightweight glass articles having the structure of and the composition of a glass according to claim 2 selected from the group of containers, drinkware, and faceplates for motor vehicle headlights.

4. A glass article according to claim 1 also containing up to 15% total of at least one component in the indicated proportion selected from the group consisting of up to about 5% ZnO, up to about 10% CaO, up to about 10% MgO, up to about 2% F, and up to about 2% $B_2O_3$.

5. A glass article according to claim 1 consisting essentially of about 14–16% $R_2O$, wherein $R_2O$ consists of $Li_2O$, $K_2O$, and $Na_2O$ in the indicated proportions of 0–3% $Li_2O$, 0–3% $K_2O$, and the remainder $Na_2O$, 5–10% MgO, 17–20% $Al_2O_3$, 50–60% $SiO_2$, 3–6% total of at least one oxide selected from the group consisting of $TiO_2$ and $ZrO_2$, and 0–2% $P_2O_5$.

* * * * *